(12) United States Patent
Provaznik et al.

(10) Patent No.: US 11,111,081 B1
(45) Date of Patent: Sep. 7, 2021

(54) SYSTEM AND METHOD FOR MANAGING MIGRATION OF ROAD BARRIERS

(71) Applicant: LINDSAY TRANSPORTATION SOLUTIONS, LLC, Omaha, NE (US)

(72) Inventors: Richard Edward Provaznik, Omaha, NE (US); Gerrit A. Dyke, Stockton, CA (US); Matthew A. Elmore, Sacramento, CA (US)

(73) Assignee: Lindsay Transportation Solutions, LLC, Omaha, NE (US)

( * ) Notice: Subject to any disclaimer, the term of this patent is extended or adjusted under 35 U.S.C. 154(b) by 0 days.

(21) Appl. No.: 16/911,963

(22) Filed: Jun. 25, 2020

(51) Int. Cl.
| | |
|---|---|
| *B65G 41/00* | (2006.01) |
| *B65G 13/00* | (2006.01) |
| *E01F 15/00* | (2006.01) |
| *B66D 1/74* | (2006.01) |

(52) U.S. Cl.
CPC ........... *B65G 41/008* (2013.01); *B65G 13/00* (2013.01); *B66D 1/7489* (2013.01); *B65G 2203/0208* (2013.01); *B65G 2203/0233* (2013.01); *B65G 2203/041* (2013.01); *B65G 2203/048* (2013.01); *E01F 15/006* (2013.01)

(58) Field of Classification Search
None
See application file for complete search history.

(56) References Cited

U.S. PATENT DOCUMENTS

| | | | | |
|---|---|---|---|---|
| 2,850,147 A | * | 9/1958 | Hill | B65G 21/14 198/303 |
| 4,266,917 A | * | 5/1981 | Godbersen | E01C 19/4893 249/8 |
| 4,852,724 A | * | 8/1989 | Bodimer | E21D 9/12 198/861.2 |
| 5,031,752 A | * | 7/1991 | Rostowski | B65G 41/008 198/735.6 |
| 6,767,158 B1 | * | 7/2004 | Consolazio | E01F 15/083 404/6 |
| 6,848,857 B1 | * | 2/2005 | McColl | E01F 15/088 404/6 |

* cited by examiner

*Primary Examiner* — Kavel Singh
(74) *Attorney, Agent, or Firm* — Hovey Williams LLP

(57) ABSTRACT

A road barrier transfer machine includes an improved capstan control system that reduces unwanted migration of road barrier spans without requiring inaccurate visual observations and reliance on outdated scripts. The barrier transfer machine includes a moveable chassis, an entry snout, an exit snout, a conveyor system, a capstan system, and the capstan control system. The capstan control system automatically operates the capstan system or provides instructions to an operator of the machine to maintain the tension and compression of a road barrier span within desired ranges to reduce unwanted migration of the span.

20 Claims, 16 Drawing Sheets

SYSTEM AND METHOD FOR MANAGING MIGRATION OF ROAD BARRIERS

BACKGROUND

Moveable road barrier systems are often placed on roadways to create traffic barriers between opposing lanes of traffic. Unlike permanent barriers, moveable road barrier systems may be repositioned to make more efficient use of space, increase vehicle capacity, and reduce traffic congestion. For example, such road barrier systems may be periodically moved back and forth to provide more lanes in directions of peak traffic and/or to create work zone space for construction crews.

A typical moveable road barrier system includes a number of steel-reinforced concrete road barriers connected end-to-end with steel pins and/or tensioning hinge mechanisms to form an elongated interlocked road barrier span. Variable length barriers may be added to the span at selected intervals to assist with the lateral movement of the road barrier spans.

Once installed, these road barrier systems may be picked up and moved with barrier transfer machines. A typical barrier transfer machine includes an entry snout for picking up a span of interconnected road barriers; an exit snout for placing the road barriers back onto the road surface in a different location; and a curved conveyor system for transporting the road barriers from the entry snout to the exit snout. The pins and/or hinge mechanisms that connect the road barriers and mechanisms within the variable length barriers permit the overall span to stretch and/or compress when the span is picked up to assist with the lateral transfer of the span from one side of a roadway to the other.

However, because road barriers are very heavy, they often migrate downhill when they are transferred on hilly roadways or other inclined surfaces, resulting in excessive compression in portions of the span near the bottom of inclines and excessive tension in portions of the span near the top of inclines. These compression or tension forces can make it difficult and sometimes impossible to subsequently pickup and reposition the road barriers, requiring time-consuming remedial actions.

To alleviate these compression/tension problems, many barrier transfer machines include capstan systems that help keep road barrier spans near their original longitudinal locations while they are suspended and repositioned. But many capstan systems require visual observations and manual control and are therefore often difficult to accurately operate, especially for inexperienced operators. Such systems thus sometimes don't alleviate compression/tension problems and occasionally make them worse. Some capstan systems are automatically controlled via pre-programmed scripts, but such scripts typically only consider characteristics of roadways and conditions of road barrier spans when the spans are first installed and can't account for actual compression/tension problems experienced by the spans as they are repeatedly repositioned over time.

SUMMARY

The present invention solves the above-described problems and related problems and provides a distinct advance in the art of road barrier transfer machines. More particularly, the invention provides a road barrier transfer machine with an improved capstan control system that reduces unwanted migration of road barrier spans without requiring inaccurate visual observations and reliance on static scripts.

A barrier transfer machine constructed in accordance with an embodiment of the invention broadly comprises a moveable chassis, an entry snout, an exit snout, a conveyor system, a capstan system, and the above-mentioned capstan control system.

The chassis has a forward and rearward ends and rides on wheels, belts, or other ground-engaging traction elements that are driven by conventional engines, transmissions, and associated mechanical and electrical components. In one embodiment, two operator cabs are supported on the chassis, one at each end of the chassis. The machine can be driven in either direction, but typically only one of the cabs can be in charge of the capstan system controls at any one time. Other embodiments of the machine may have only one cab or even no cab at all, instead being controlled remotely or autonomously.

Both snouts of the barrier transfer machine can pick up and put down the road barriers because either end of the machine can be in the front. As used herein, the entry snout is defined as the snout on the end of the chassis that is currently in front and that picks up the road barrier span from a first location on a road surface, and the exit snout is defined as the snout on the on the ed of the chassis that is currently in the rear and places the span back onto the road surface in a second location different from the first location.

The conveyor system extends beneath the chassis and transports the road barrier span from the entry snout to the exit snout. In one embodiment, the conveyor system consists of an "S" shaped structural frame attached to the bottom of the chassis and an array of bogeys supported by the frame that pick up and carry the barriers through the machine during the transfer operation.

The capstan system is mounted alongside the conveyor system and can be operated to adjust the tension or compression in the road barrier span while the road barriers are suspended by the conveyor system. In one embodiment, the capstan system comprises two large capstan wheels on each side of the conveyor system, hydraulic cylinders, linkages, and/or other mechanisms for urging the wheels against the road barriers as they pass by the capstan system, and motors and pumps for driving the wheels for applying varying forward or rearward pressures on the road barriers.

In accordance with important aspects of the invention, the control system automatically operates the capstan system or provides instructions to an operator of the machine to maintain the tension and compression of a road barrier span within desired ranges to reduce unwanted migration of the span. Importantly, the control system does not rely on complete manual control of the capstan system or pre-programmed scripts. An embodiment of the control system broadly includes a data receiver for receiving data from at least one sensor and a processing system for receiving and analyzing the sensor data.

The data receiver may receive data from a variety of sensors either via wired or wireless connections. In one embodiment, one of the sensors senses tension or compression in the span and generates corresponding sensor data. The sensor may be a pressure transducer that senses pressure within an internal hydraulic cylinder of one of the variable length barricades. In some embodiments, several or all of the variable length barricades within a span may be equipped with pressure transducers.

In another embodiment, at least one of the sensors may be a linear measurement sensor, optical sensor, or other sensor configured for measuring a length of one of one of the variable length barriers.

In another embodiment, the sensor may be a camera mounted to the entry snout of the machine for sensing positions of at least some of the road barriers before they are picked up. In another embodiment, the sensor may be a GPS receiver mounted in at least one of the barriers for determining a position of the barrier before it is picked up The processing system receives and analyzes the sensor data along with reference data to determine if the tension or compression of the span is within an acceptable range. If it's not, it either automatically controls operation of the capstan system to adjust the tension or compression in the span or provides control instructions to an operator. For example, if the processing system determines the road barrier span is experiencing excessive tension, it directs the capstan system to apply an appropriate amount of forward rotational pressure on the span to alleviate some of the excess tension or provides corresponding instructions to an operator. Conversely, if the processing system determines the road barrier span is experiencing excessive compression, it directs the capstan system to apply an appropriate amount of rearward rotational pressure on the span to alleviate some of the excess compression or provides corresponding instructions to an operator.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
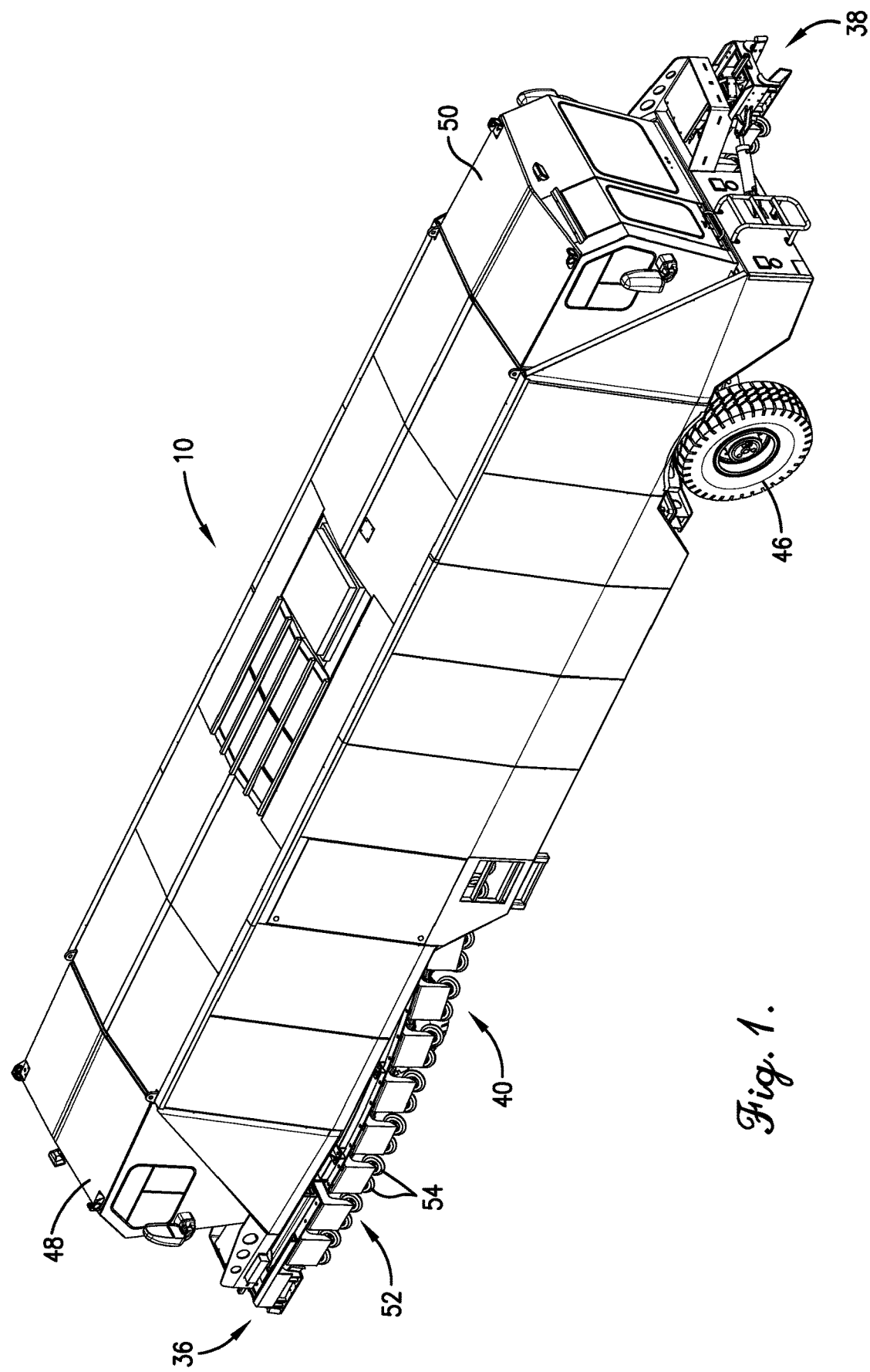
FIG. 1 is a top perspective view of a barrier transfer machine constructed in accordance with embodiments of the present invention.
Figure 2:
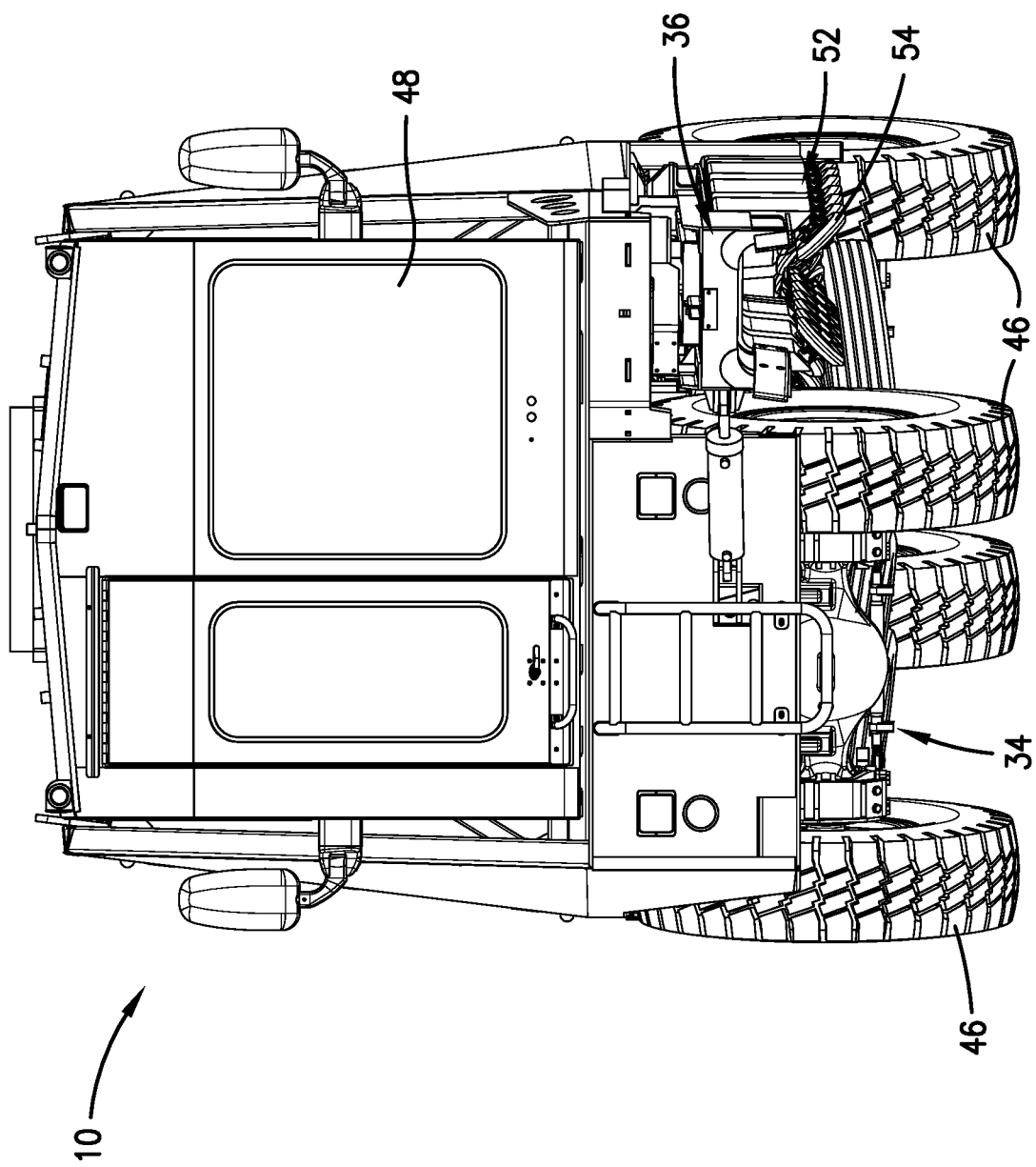
FIG. 2 is a front or rear view of the barrier transfer machine.
Figure 3:
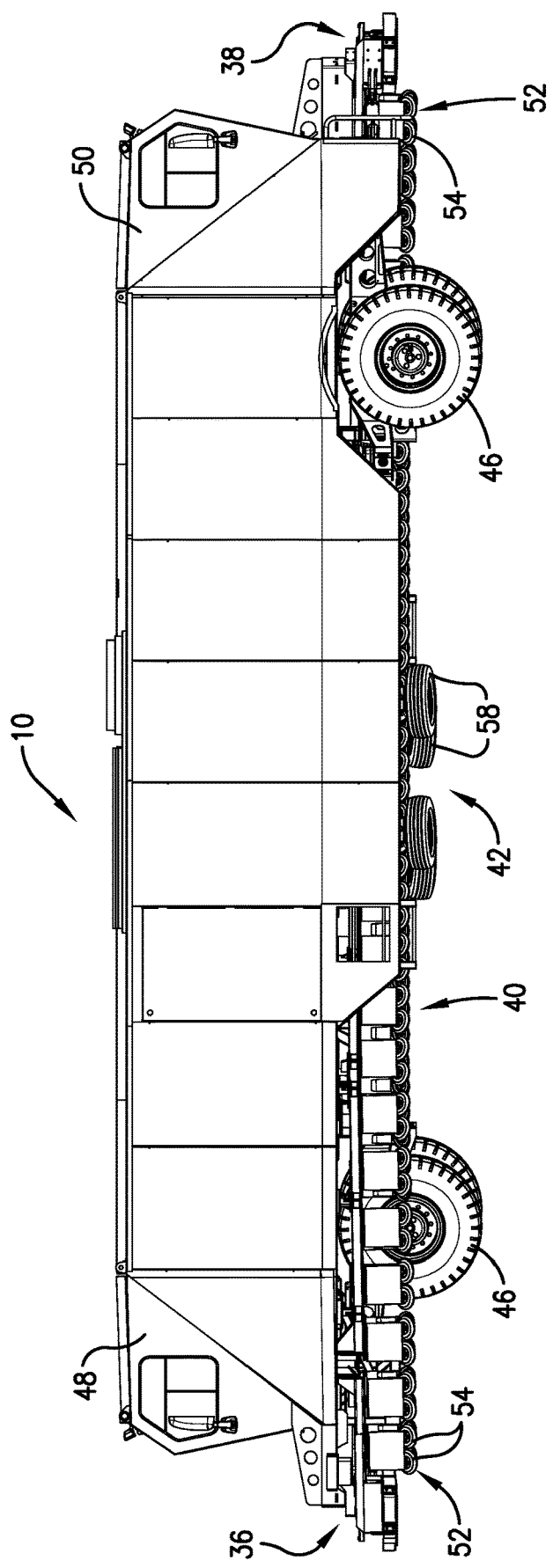
FIG. 3 is a side view of the barrier transfer machine.
Figure 4:
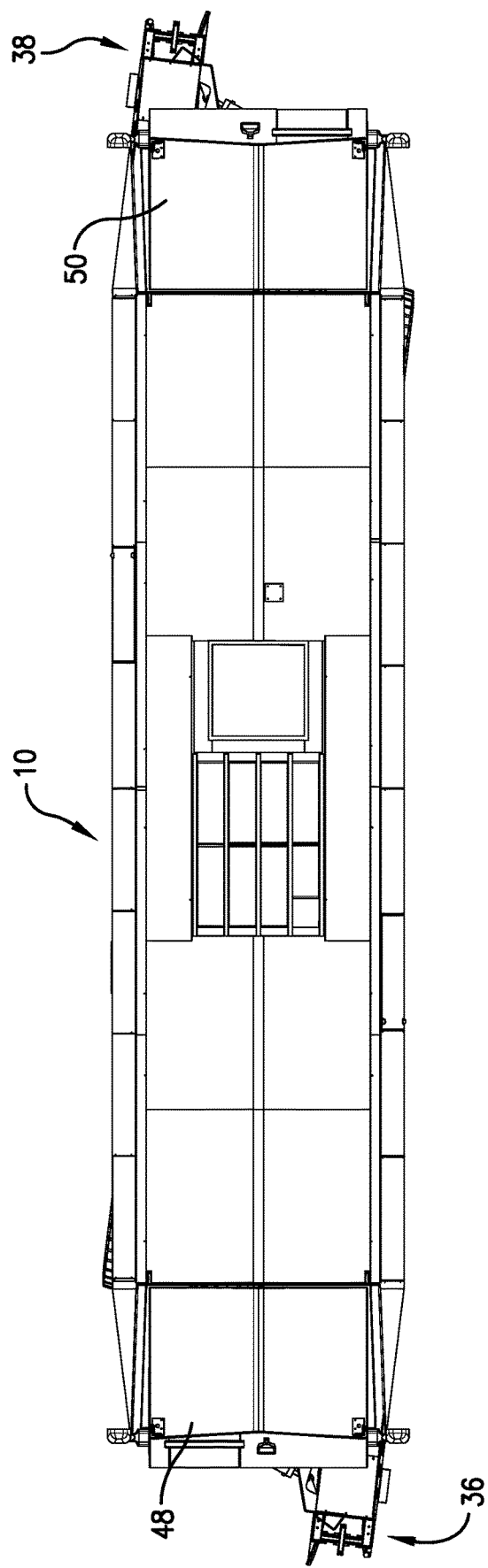
FIG. 4 is a top view of the barrier transfer machine.

The drawing figures do not limit the present invention to the specific embodiments disclosed and described herein. The drawings are not necessarily to scale, emphasis instead being placed upon clearly illustrating the principles of the invention.

DETAILED DESCRIPTION

Figure 6:
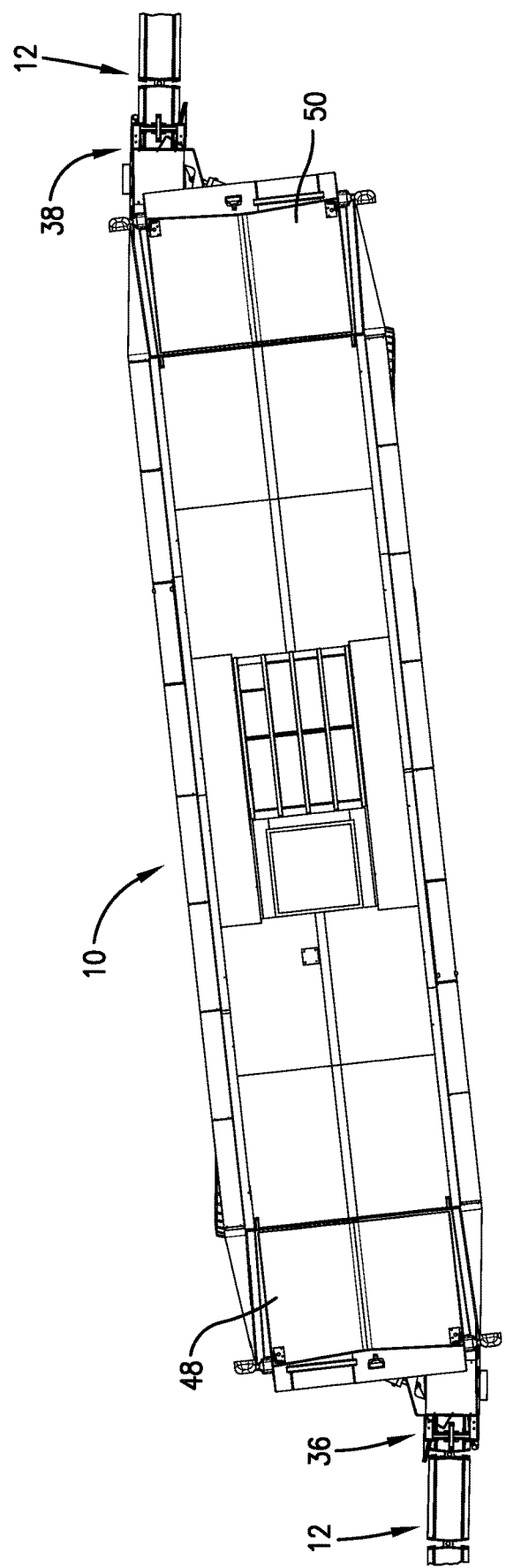
FIG. 6 is a top view of the barrier transfer machine shown moving a road barrier span from one side of a roadway to another side.
Figure 7:
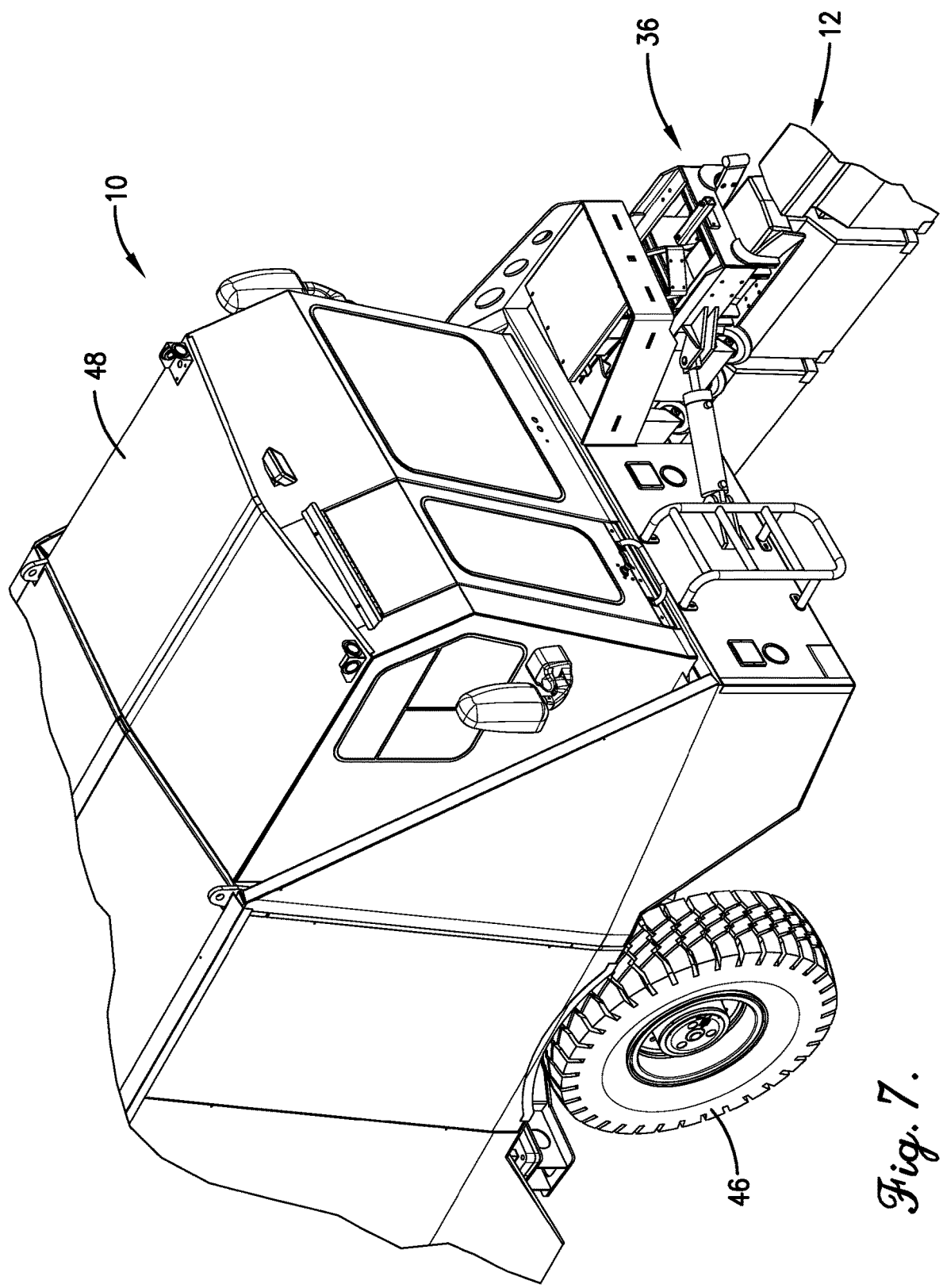
FIG. 7 is a fragmentary front perspective view of the barrier transfer machine shown picking up a span of road barriers.
Figure 8:
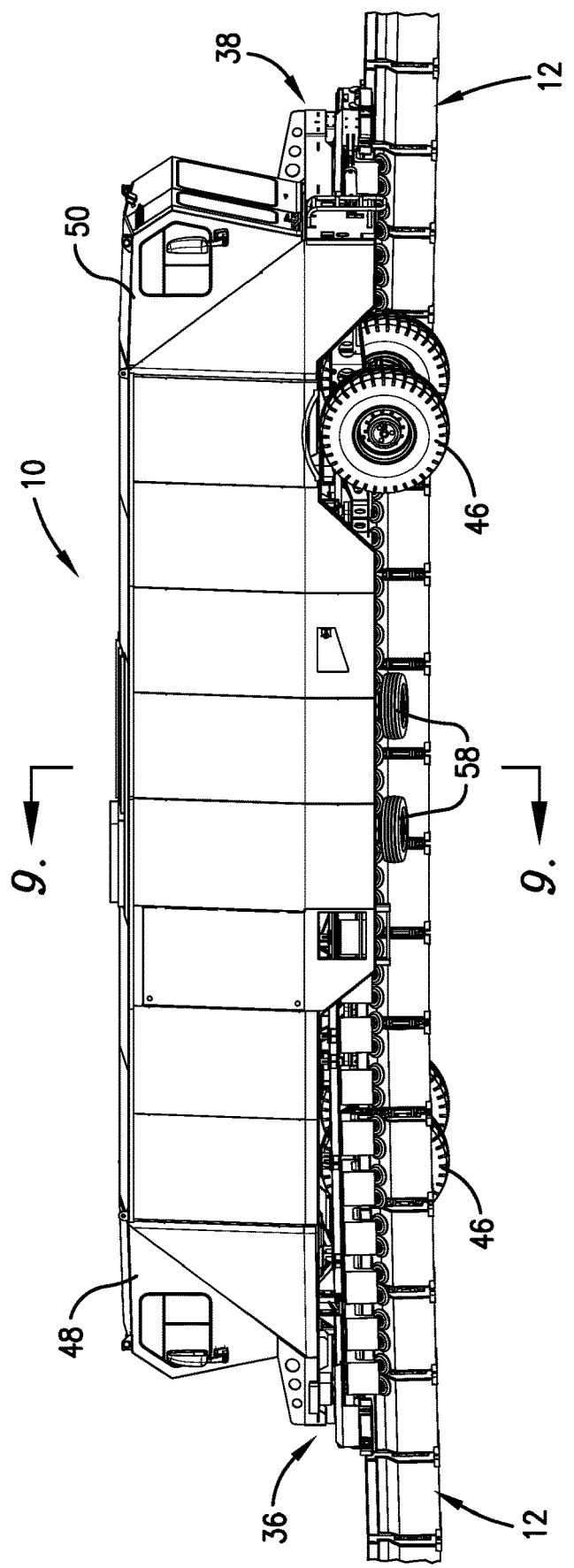
FIG. 8 is a side view of the barrier transfer machine shown picking up and repositioning a span of road barriers.

Turning now to the drawing figures and initially FIG. 1, a barrier transfer machine 10 constructed in accordance with embodiments of the invention is depicted. As shown in FIG. 6, the barrier transfer machine 10 is configured for picking up and repositioning a span of interconnected road barriers 12 to provide more lanes in directions of peak traffic, to create work zone space for construction crews, or to otherwise make more efficient use of roadway space, increase vehicle capacity, and/or reduce traffic congestion.

Figure 15:
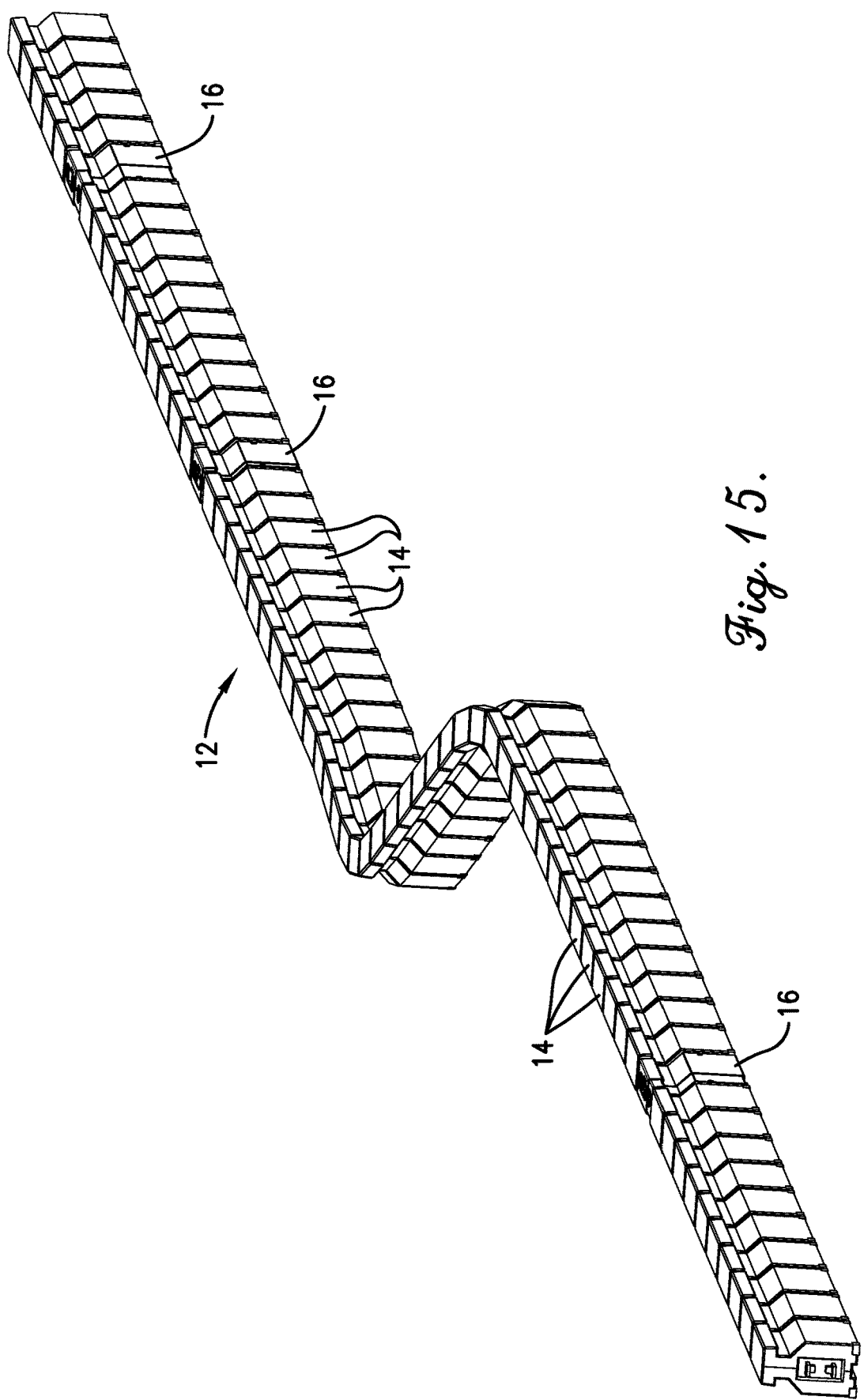
FIG. 15 is a perspective view of an exemplary road barrier span.

An exemplary span of road barriers 12 that may be picked up and repositioned by the barrier transfer machine 10 is depicted in FIG. 15. The span 12 may be any length and may include any number of fixed-length road barriers 14 and variable length barriers 16. In some embodiments, the barriers 14, 16 are connected end-to-end with steel pins and/or tensioning hinge mechanisms described in more detail below.

Figure 9:
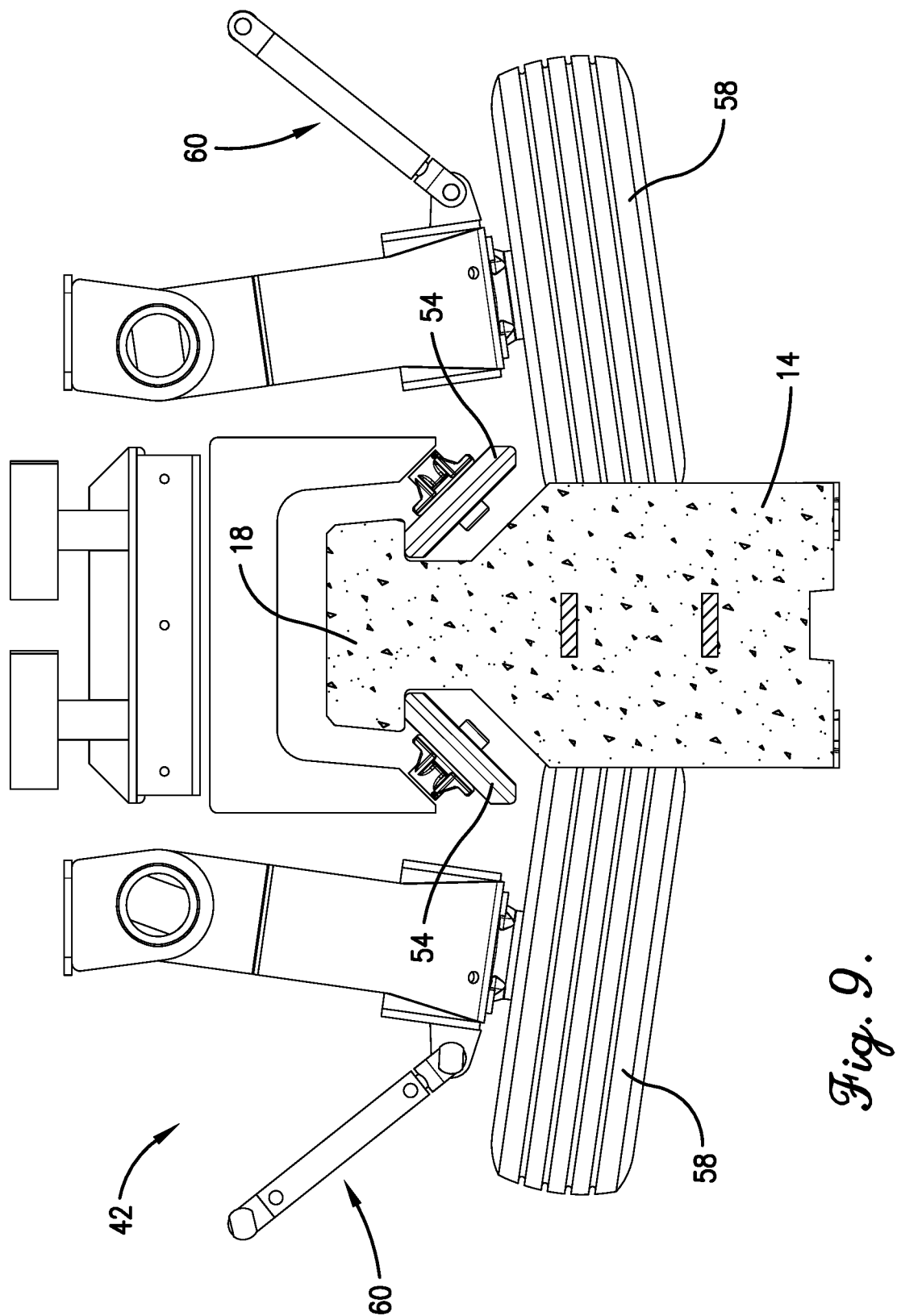
FIG. 9 is a vertical cross-sectional view of the barrier transfer machine taken along line 9/9 of FIG. 8 to better illustrate the capstan system.
Figure 10:
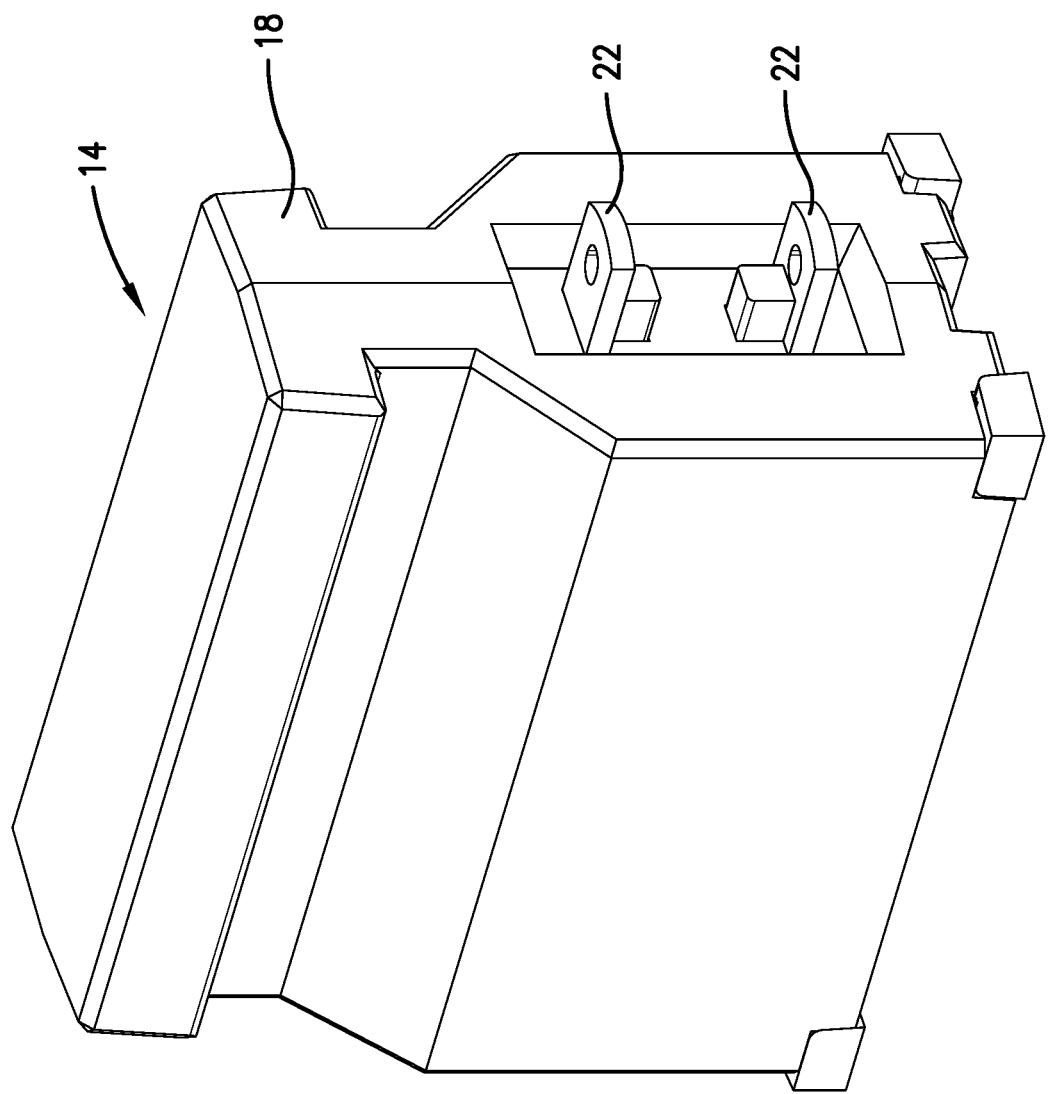
FIG. 10 is a right side perspective view of a fixed road barrier.
Figure 11:
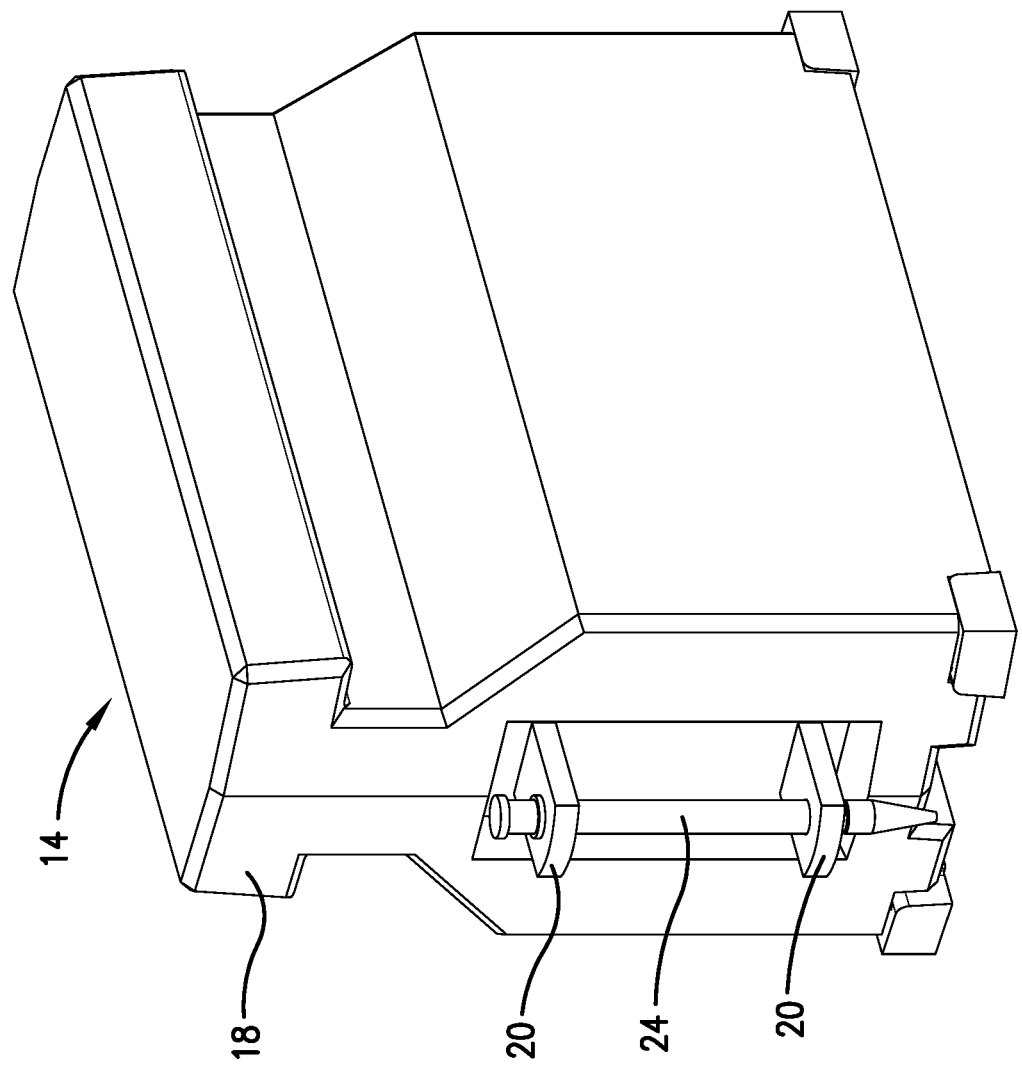
FIG. 11 is a left side perspective view of the fixed road barrier.

Examples of the fixed length barriers 14 are shown in FIGS. 10 and 11. The barriers 14 may be any type, shape, and size and may be formed of any suitable materials such as heavily reinforced concrete or high strength steel frames filled with concrete. In one embodiment, the barriers 14 have T-shaped tops 18 so they can be picked up and repositioned by bogey wheels of the barrier transfer machine as shown in FIG. 9 and described below.

Returning to FIGS. 10 and 11, one side of each barrier 14 includes fixed, spaced apart, connection flanges 20, and the opposite side includes spaced apart, reactive tension elements 22. A steel rod 24 may be inserted through holes in the flanges 20 and tension elements 22 of adjacent barriers when they are aligned to interconnect the adjacent barriers. The reactive tension elements 22 allow adjacent barriers to move longitudinally relative to one another when the barriers are under tension or compression. In other embodiments, the fixed length barriers may not have reactive tension elements, but instead may have larger holes in the connection flanges that create "sloppy hinges" to accommodate some longitudinal movement between adjacent barriers.

Figure 12:
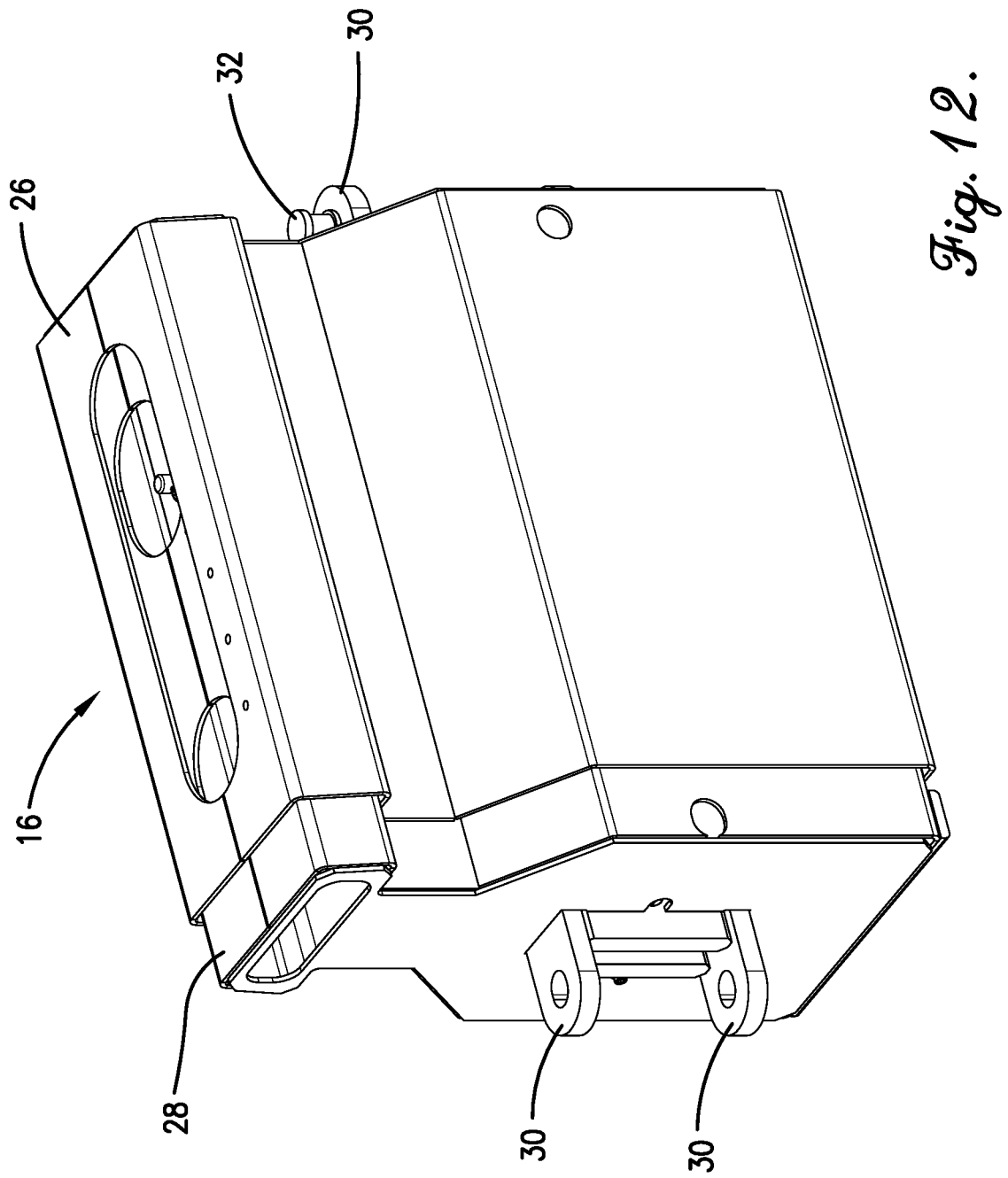
FIG. 12 is a perspective view of a variable length road barrier shown in its retracted position.
Figure 13:
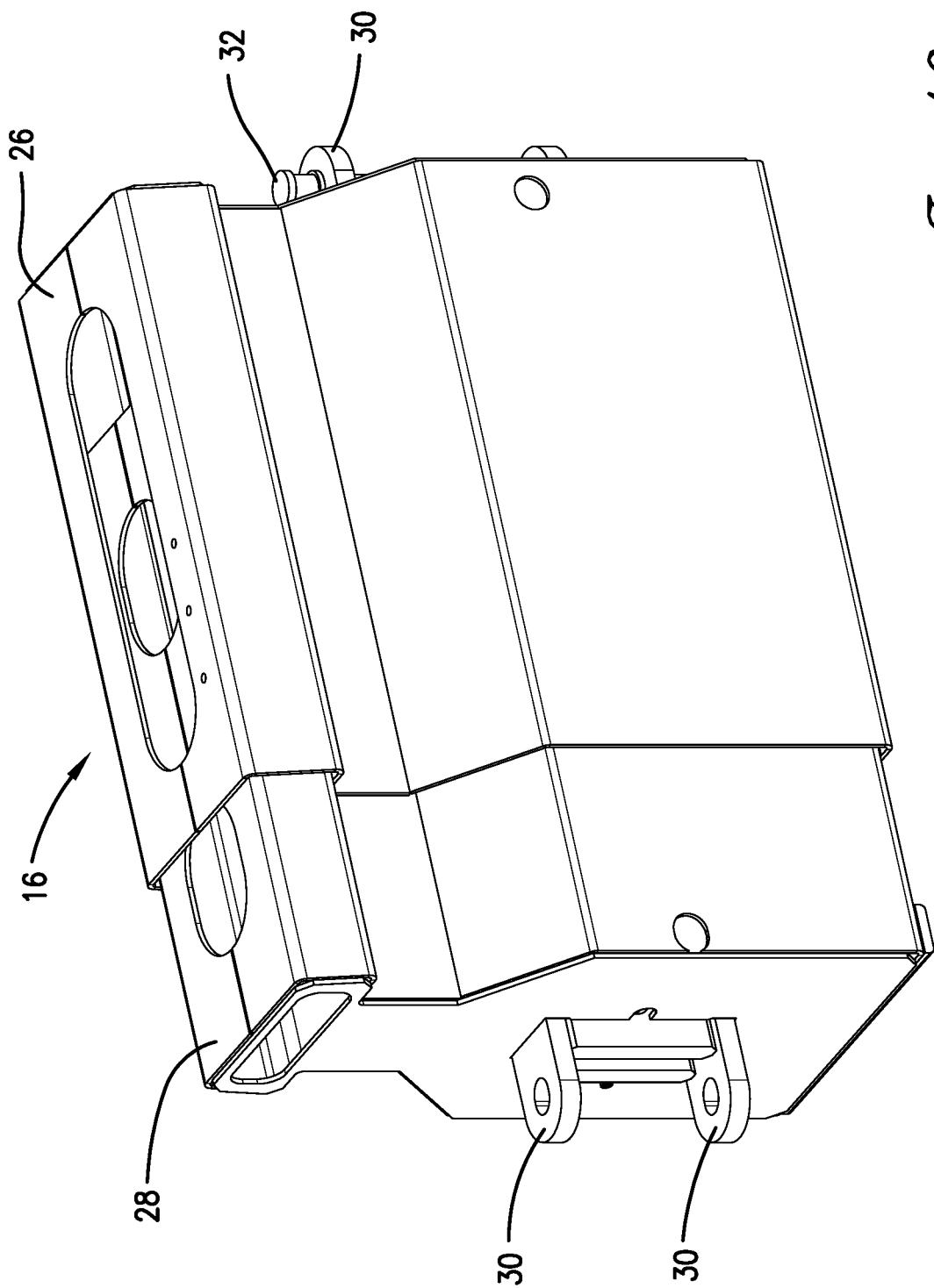
FIG. 13 is a perspective view of the variable length road barrier shown in its mid-stroke or neutral position.
Figure 14:
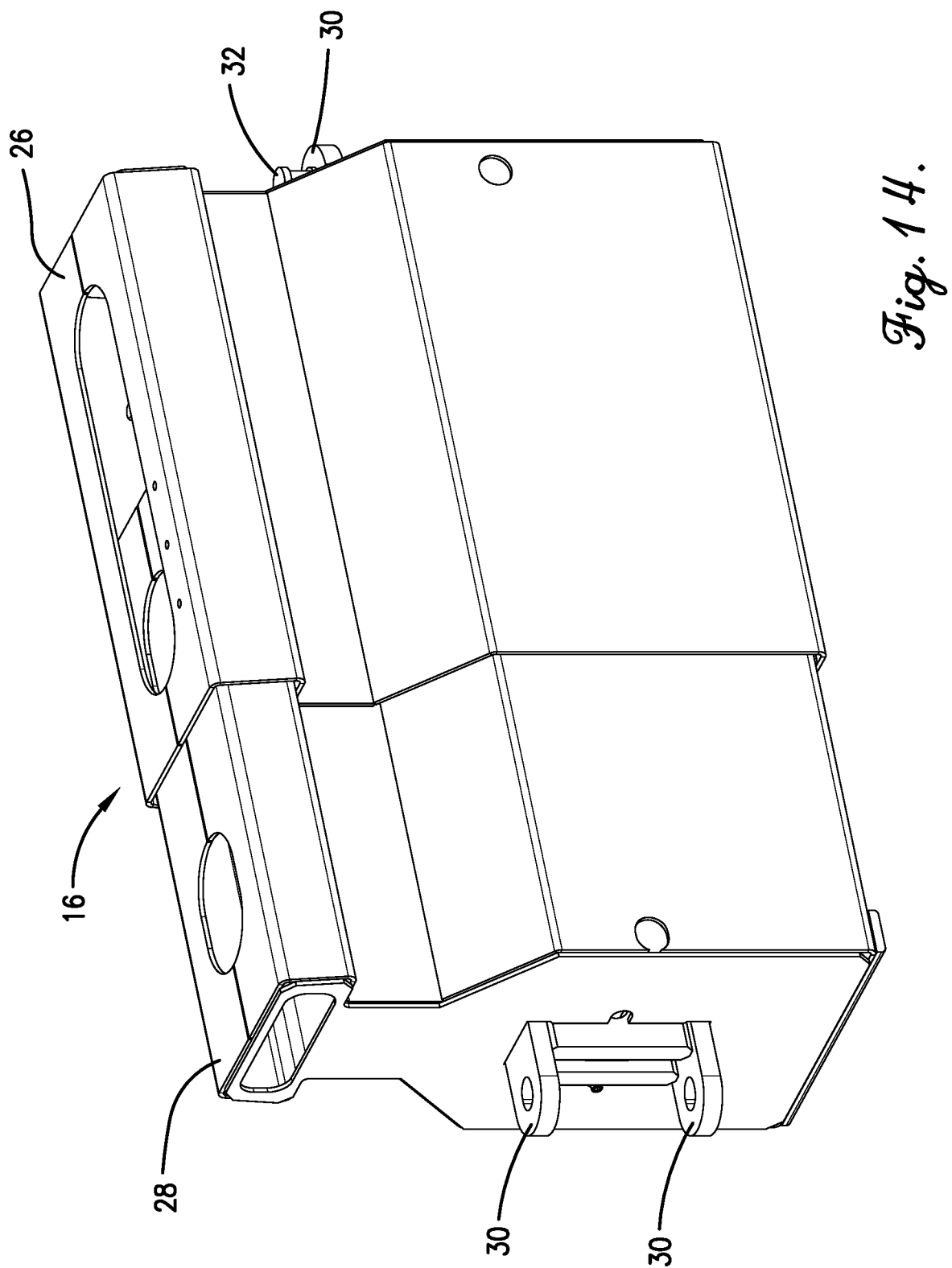
FIG. 14 is a perspective view of the variable length road barrier shown in its fully extended position.

Examples of the variable length barriers 16 are shown in FIGS. 12-14. The barriers may be any shape and size and each has an outer frame 26 and an inner telescoping structure 28 that may move in and out of the outer frame 26 when the barrier is subjected to tension or compression forces. The variable length barriers also include connection flanges 30 that may be aligned with and interconnected to the connection flanges of adjacent barriers with a steel rod 32. Movement of the telescoping inner structure 28 is resisted by internal hydraulic cylinders or other hydraulic or spring mechanisms.

FIG. 12 shows a variable length barrier 16 in its fully retracted or compressed state when subjected to a compressive force of a magnitude sufficient to fully compress the hydraulic cylinders or other biasing mechanisms. FIG. 14 shows the barrier 16 in its fully extended state when subjected to a tension force of a magnitude sufficient to fully extend the hydraulic cylinders or other biasing mechanisms. FIG. 13 shows the barrier in its neutral or steady state when it is not subjected to a compressive or tension force. More details of exemplary embodiments of variable length barriers are disclosed in U.S. Pat. No. 6,439,802, which is incorporated into the present application by reference in its entirety.

Aspects of the barrier transfer machine 10 will now be described in more detail. An embodiment of the barrier transfer machine broadly comprises a moveable chassis 34, an entry snout 36, an exit snout 38, a conveyor system 40, a capstan system 42, and a control system 44 that controls the capstan system.

The chassis 34 has two ends disposed along a generally longitudinal axis that is essentially parallel to a roadway over which the machine is driven. Either end of the chassis may be the forward end or the rearward end depending on the direction of travel of the machine. As used herein, the forward end is defined as the end at which road barriers are currently being picked up, and the rearward end is defined as the end at which the road barriers are currently being placed backed down. The chassis 34 rides on wheels 46, belts, or other ground-engaging traction elements that are driven by conventional engines, transmissions, and associated mechanical and electrical components.

In one embodiment, the barrier transfer machine 10 is equipped with two cabs 48, 50, one at each end of the chassis 34. The machine 10 can be driven in either direction, but typically only one operator in one of the cabs can be in charge of the capstan controls at any one time. Usually the cab in control is the cab at the end of the machine pointing towards the direction in which the machine is traveling. Other embodiments of the machine may have only one cab or even no cab at all. In some embodiments, the barrier transfer machine 10 may include various sensors and controls that provide autonomous operation without direct operator control or semi-autonomous operation with some operator control.

The entry snout 36 is mounted on a front end of the chassis and is configured for picking up the road barrier span from a first location on a road surface, and the exit snout 38 is mounted on the rear end of the chassis for placing the span back onto the road surface in a second location different from the first location. The snouts act as guides for the road barriers as they are picked up and/or dropped off and can be moved and adjusted by operators of the machine to align the snouts with the incoming road barriers and the desired placement positions. Each snout 36, 38 includes an array of bogey assemblies 52 supported on the conveyor frame described below. Each bogey assembly 52 comprises a number of carrier wheels 54 that pick up, carry, and/or lay down the barriers depending on the direction of travel of the machine.

Figure 5:
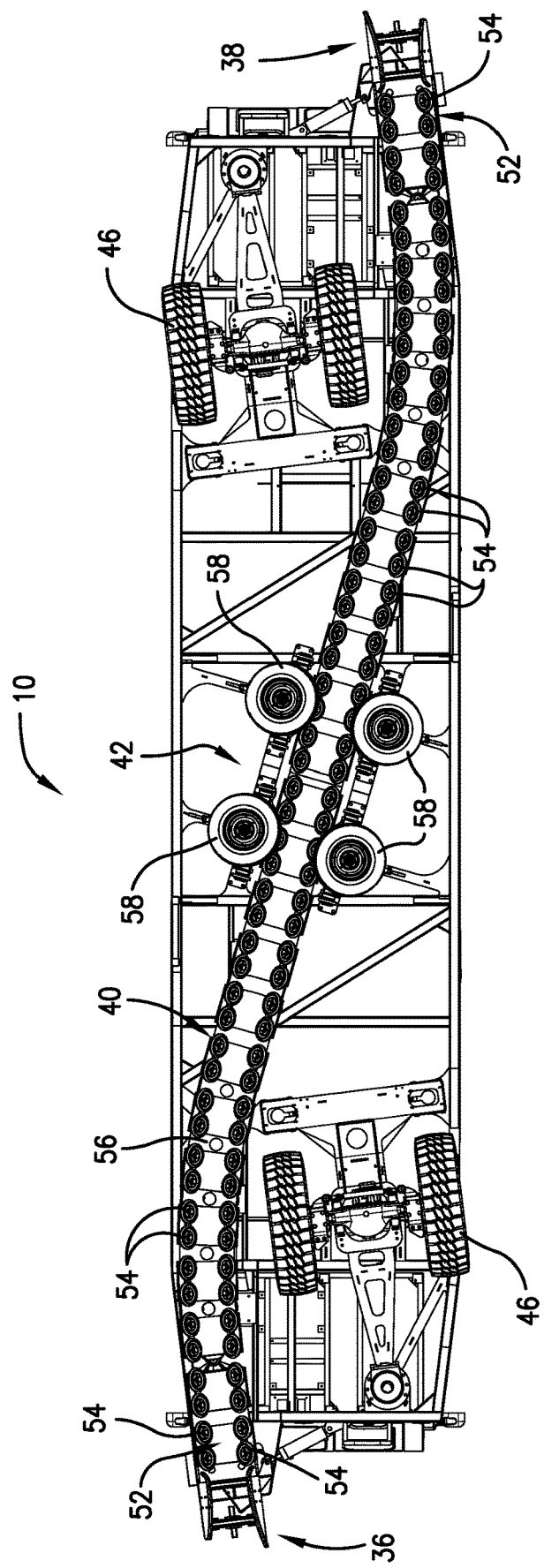
FIG. 5 is a bottom view of the barrier transfer machine.

The conveyor system 40 extends beneath the barrier transfer machine and is configured for transporting the span of road barriers from the entry snout 36 to the exit snout 38. The conveyor system 40 may be comprised of multiple assemblies and sections including straight sections, turn sections, and pickup/laydown sections connected to the snouts 36, 38. As best shown in FIG. 5, an embodiment of the conveyor system 40 comprises an S-shaped or otherwise curved structural frame 56 attached to the bottom of the machine and an array of bogey assemblies 52 supported to the frame. Each bogey assembly 52 comprises a number of carrier wheels 54 that pick up and carry the barriers through the machine during a barrier transfer operation.

The capstan system 42 is mounted alongside the conveyor system 40 and adjusts the tension or compression in the road barrier span 12 while it is being transported by the conveyor system in an attempt to keep the barrier span in its original longitudinal location relative to the road. The capstan system 42 is especially important in hilly areas, on ramps, and in other situations where a roadway may be inclined. Without the capstan system, the heavy barriers would migrate downhill when picked up and transferred. Migration of the barriers causes excessive tension at the top of an incline and compression towards the bottom making the span difficult and even sometimes impossible to move.

As best shown in FIGS. 5 and 9, an embodiment of the capstan system 42 comprises a pair of large capstan wheels 58 on each side of the conveyor system, hydraulic cylinders, linkages, or other mechanisms 60 for urging the wheels against the road barriers as they pass by, and motors and pumps for driving the wheels so as to apply varying forward and rearward pressures on the road barriers. The capstan system 42 works by clamping the barriers with the capstan wheels 58 as they pass by on the conveyor system 42 and applying either forward or backward rotational pressure on the barriers. This alleviates excessive tension or compression in the span to reduce barrier migration and/or to reposition the barriers relative to one another.

In prior art road barrier transfer machines, the capstan systems are controlled by operators either manually or with pre-programed scripts. Manual control requires visual observations of the road barriers as they are being picked up and on-the-fly adjustments to the forward or backward rotational pressure applied by the capstan wheels. Such manual operations are often inaccurate and inconsistent, especially for inexperienced operators, and thus sometimes do not alleviate compression/tension problems and occasionally make them worse. Control via pre-programmed scripts can be more consistent and predictable, but scripts typically only consider characteristics of roadways and conditions of road barrier spans when the spans are first installed and don't account for actual compression/tension problems experienced by the spans as they are repeatedly repositioned over time.

The capstan control system 44 of the present invention solves the above-described problems by controlling the capstan system 42 to reduce unwanted migration of the road barrier span 12 without inaccurate visual observations, manual controls, and outdated scripts. As explained in more detail below, the control system 44 monitors actual tension and/or compressive forces in the road barrier span 12 and either automatically operates the capstan system 42 or provides instructions to an operator of the machine 10 to alleviate excessive tension or compression to reduce unwanted migration of the span.

Figure 16:
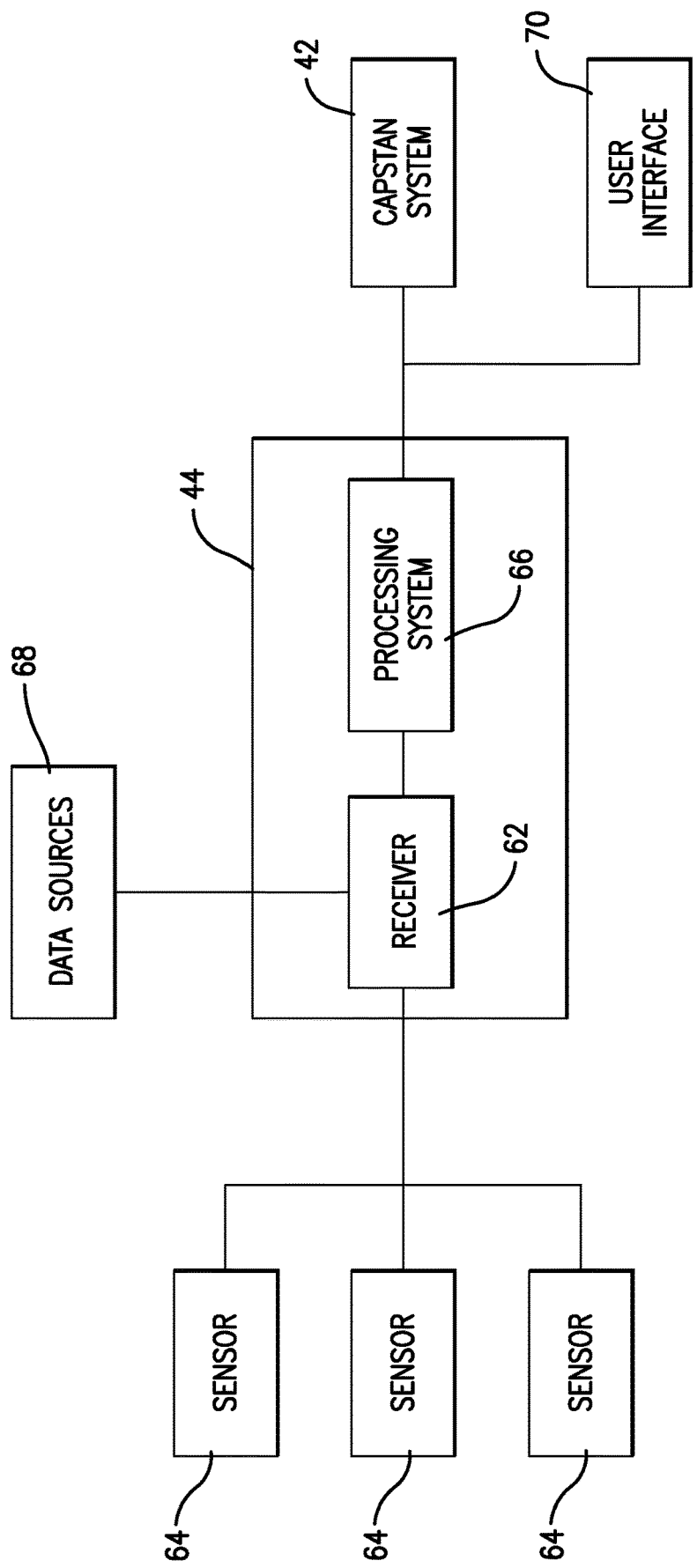
FIG. 16 is a block diagram depicting components of a capstan control system of the barrier transfer machine.

An embodiment of the control system 44 is depicted in FIG. 16 and broadly comprises a data receiver 62 for receiving data from at least one sensor 64 and a processing system 66 for receiving and analyzing the sensor data and reference data and providing appropriate instructions to the capstan system 42 or a user interface 70. The control system 44 may be a stand-alone control system or may be incorporated in other control systems of the barrier transfer machine 10 including pre-existing capstan control systems.

The data receiver 62 may be any device capable of receiving data via wired or wireless connections. The data receiver may be, or include, a wired or wireless network adapter or a wireless data transceiver for use with Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMAX) and the like.

As shown in FIG. 16, the data receiver 62 receives data from one or more sensors 64 that are mounted on some of the road barriers and/or on the barrier transfer machine 10 itself. The sensors 64 sense parameters that are representative of tension or compression in the road barrier span and generate corresponding sensor data.

In one embodiment, at least one of the sensors 64 is a pressure transducer mounted within or on one of the variable length barriers 16. The sensor senses tension or compression in the barrier span by monitoring pressure within an internal hydraulic cylinder of the variable length barrier 16 and/or a valve connected to the hydraulic cylinder. In some embodiments, a pressure transducer may be mounted in each and every variable length barrier 16 within the span 12. In this embodiment, each sensor includes or is connected to a communication element such as a wireless transmitter for transmitting sensor data to the data receiver 62 for analysis by the processing system 66.

In another embodiment, at least one of the sensors 64 may be a linear measurement sensor, optical sensor, or other sensor configured for measuring a length of one of one of the variable length barriers 16. The length of a variable length barrier 16 is associated with tension or compression in the barrier span. For example, a variable length barrier in its fully retracted state (shortest length) as shown in FIG. 12 is under compression and indicates the entire span is under compression, a variable length barrier in its neutral state as shown in FIG. 13 is not subjected to excessive compressive or tension force, and a variable length barrier in its fully extended state (greatest length) as shown in FIG. 12 is under tension and indicates the entire span is under tension. In some embodiments, a linear measurement sensor, optical sensor, or other sensor configured for measuring length may be mounted on or in each and every variable length barricade 16 within the span 12. In these embodiments, each sensor includes or is connected to a communication element such as a wireless transmitter for transmitting sensor data to the data receiver 62 for analysis by the processing system 66.

In another embodiment, at least one of the sensors 64 may be a camera mounted to the entry snout 36 of the barrier transfer machine 10 for sensing positions of at least some of the road barriers before they are picked up and generating related positional data. The positions of the barriers are associated with tension or compression in the barrier span because barriers that have migrated longitudinally indicate tension or compression in the span.

In yet another embodiment, at least one of the sensors 64 may be a may be a global navigation satellite system (GNSS) receiver such as a GPS receiver, Glonass receiver, Galileo receiver, or compass system receiver operable to receive navigational signals from satellites to calculate positions of the barriers as a function of the signals. The GNSS receiver may include one or more processors, controllers, or other computing devices and memory for storing information accessed and/or generated by the processors or other computing devices and may include or be coupled with a patch antenna, helical antenna, or any other type of antenna. The GNSS receiver may be mounted in at least one of the barriers for determining a position of the barrier before it is picked up and generating related positional data.

As mentioned above, the positions of the barriers is associated with tension or compression in the barrier span because barriers that have migrated longitudinally indicate tension or compression in the span. In this embodiment, each sensor includes or is connected to a communication element such as a wireless transmitter for transmitting sensor data to the data receiver 62 for analysis by the processing system 66.

In some embodiments, the control system 44 may receive data from several different types of sensors. For example, the data receiver 62 may receive data from pressure transducers mounted in some or all the variable length barricades, length measurement sensors mounted in some or all the variable length barricades, a camera mounted to the entry snout of the barrier transfer machine, and one or more GPS or GNSS receivers mounted on some of the road barriers.

The control system 44 may also receive reference data and other data from other data sources 68 such as resident memory in another control system in the barrier transfer machine, external computers, and/or computers, smart phones, and other electronic devices used by operators of the machine. Such data may include expected or reference positions of the road barriers, expected or reference lengths of the variable length road barriers, expected or reference pressure readings of hydraulic components in the variable length road barriers, and/or other data that is analyzed by the processing system 66 and compared to the sensor data to determine if the road barrier span is experiencing excessive compressive or tension forces.

The processing system 66 receives and analyzes the sensor data, and in some embodiments other data from the data sources 68, to determine if the tension or compression of the road barrier span 12 is within an acceptable range. If it is not, it either automatically controls operation of the capstan system 42 to adjust the tension or compression in the span or provides control instructions to an operator via the user interface 70. For example, if the processing system 66 determines the road barrier span 12 is experiencing excessive tension, it directs the capstan system 42 to apply an appropriate amount of forward rotational pressure on the span to alleviate some of the excess tension. Conversely, if the processing system determines the road barrier span 12 is experiencing excessive compression, it directs the capstan system to apply an appropriate amount of rearward rotational pressure on the span to alleviate some of the excess compression.

The processing system 66 may be programmed or otherwise configured in various different ways to perform the above-described analysis. For example, when the sensor data is from pressure transducers mounted in the variable length barriers, the processing system 66 may monitor the pressure readings of the hydraulic cylinders, compare the readings to steady state pressure readings taken when the variable length barriers are in their neutral positions shown in FIG. 13, and determine whether the road barrier is experiencing excessive tension or compression based on the magnitude of variance between the current pressure readings and the steady state readings. The processing system 66 then either automatically controls operation of the capstan system 42 to adjust the tension or compression in the span or provides control instructions to an operator via the user interface 70.

When the sensor data is from a camera mounted to the entry snout 36 of the barrier transfer machine 10, the processing system 66 receives and analyzes the sensor data and compares the current positions of the road barriers to expected or desired positions to determine if the span of road barriers is subject to excessive tension or compression. If it is, the processing system 66 either automatically controls operation of the capstan system 42 to adjust the tension or compression in the span or provides control instructions to an operator via the user interface 70.

Similarly, when the sensor data is from a GPS or other GNSS receiver mounted in at least one of the barriers, the processing system 66 receives and analyzes the sensor data and compares the current positions of the road barrier to expected or desired positions to determine if the span of road barriers is subject to excessive tension or compression. If it is, the processing system either automatically controls operation of the capstan system to adjust the tension or compression in the span or provides control instructions to an operator via the user interface 70.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as the processing system 66, other processing elements, etc., may be implemented as special purpose or as general purpose. For example, the processing system 66 may comprise dedicated circuitry or logic that is permanently configured, such as an application-specific integrated circuit (ASIC), or indefinitely configured, such as an FPGA, to perform certain operations. The processing system 66 also comprise programmable logic or circuitry (e.g., as encompassed within a general-purpose processor or other programmable processor) that is temporarily configured by software to perform certain operations. It will be appreciated that the decision to implement the processing system as special purpose, in dedicated and permanently configured circuitry, or as general purpose (e.g., configured by software) may be driven by cost and time considerations.

Accordingly, the term "processing system" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing system is temporarily configured (e.g., programmed), each of the processing elements need not be configured or instantiated at any one instance in time. For example, where the processing system comprises a general-purpose processor configured using software, the general-purpose processor may be configured as respective different processing elements at different times. Software may accordingly configure the processing element to constitute a hardware configuration at one instance of time and to constitute a different hardware configuration at a different instance of time.

Computer hardware components, such as the processing system 66, data receiver 62, associated memory elements, processing elements, and the like, may provide information to, and receive information from, other computer hardware components. For example, portions of the processing system 66 may be part of a cloud computing network. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A barrier transfer machine for picking up and repositioning a span of interconnected road barriers, the barrier transfer machine comprising:
 an entry snout mounted on a front end of the barrier transfer machine for picking up the span of interconnected road barriers from a first location on a road surface;
 an exit snout mounted on the rear end of the barrier transfer machine for placing the span of interconnected road barriers back onto the road surface in a second location different from the first location;
 a conveyor system positioned between the entry snout and the exit snout for transporting the span of interconnected road barriers from the entry snout to the exit snout;
 a capstan system for adjusting tension or compression in the span of interconnected road barriers while the span of interconnected road barriers is being transported by the conveyor system;
 a control system for operating the capstan system, the control system comprising:
  a data receiver for receiving sensor data from a sensor that senses tension or compression in the span of interconnected road barriers; and
  a processing system for receiving and analyzing the sensor data to determine if the tension or compression of the span of interconnected road barriers is outside an acceptable range, and for controlling operation of the capstan system to adjust the tension or compression in the span of interconnected road barriers if the tension or compression is outside the acceptable range.

2. The barrier transfer machine as set forth in claim 1, wherein the processing system is further operable for either automatically controlling operation of the capstan system to adjust the tension or compression in the span of interconnected road barriers if the tension or compression is outside the acceptable range or for providing instructions to an operator of the barrier transfer machine to control operation of the capstan system to adjust the tension or compression in the span of interconnected road barriers if the tension or compression is outside the acceptable range.

3. The barrier transfer machine as set forth in claim 1, wherein the processing system is located on the barrier transfer machine or remotely from the barrier transfer machine.

4. The barrier transfer machine as set forth in claim 1, wherein a barrier within the span of interconnected road barriers is a variable length barrier and wherein the sensor senses tension or compression in the span of interconnected road barriers by sensing a length of the variable length barrier.

5. The barrier transfer machine as set forth in claim 1, wherein a barrier within the span of interconnected road barriers is a variable length barrier having an internal hydraulic cylinder and wherein the sensor senses tension or compression in the span of interconnected road barriers by sensing a pressure of the internal hydraulic cylinder.

6. The barrier transfer machine as set forth in claim 1, wherein the sensor senses tension or compression in the span of interconnected road barriers by sensing a position of a road barrier within the span of interconnected road barriers before the road barrier is picked up by the entry snout.

7. The barrier transfer machine as set forth in claim 6, wherein the sensor includes a camera for sensing the position of the road barrier before the road barrier is picked up by the entry snout.

8. The barrier transfer machine as set forth in claim 6, wherein the sensor includes a GNSS receiver in the road barrier for sensing the position of the road barrier before the road barrier is picked up by the entry snout.

9. The barrier transfer machine as set forth in claim 1, wherein the road surface is a roadway, a shoulder of a roadway; a driving lane on a bridge surface; a shoulder of a bridge surface;
 a parking lot; an on-ramp; or an off-ramp.

10. A barrier transfer machine for picking up and repositioning a span of interconnected road barriers, wherein the span of interconnected road barriers includes at least one variable length barrier, the barrier transfer machine comprising:

an elongated moveable chassis having a front end and a rear end;

an entry snout mounted on a front end of the chassis for picking up the span of interconnected road barriers from a first location on a road surface;

an exit snout mounted on the rear end of the chassis for placing the span of interconnected road barriers back onto the road surface in a second location different from the first location;

a conveyor system positioned below the chassis between the entry snout and the exit snout for transporting the span of interconnected road barriers from the entry snout to the exit snout;

a capstan system for adjusting tension or compression in the span of interconnected road barriers while the span of interconnected road barriers is being transported by the conveyor system;

a control system for operating the capstan system, the control system comprising:
- a data receiver for receiving data from a sensor that senses tension or compression in the span of interconnected road barriers and generates sensor data indicative of the tension or compression, wherein the sensor senses tension or compression in the span of interconnected road barriers by sensing a state of the variable length barrier; and
- a processing system for receiving and analyzing the sensor data to determine if the tension or compression of the span of interconnected road barriers is outside an acceptable range and for controlling operation of the capstan system to adjust the tension or compression in the span of interconnected road barriers if the tension or compression is outside the acceptable range.

11. The barrier transfer machine as set forth in claim 10, wherein the state of the variable length barrier is a length of the variable length barrier.

12. The barrier transfer machine as set forth in claim 10, wherein the variable length barrier has an internal hydraulic cylinder.

13. The barrier transfer machine as set forth in claim 12, wherein the state of the variable length barrier is a pressure experienced by the internal hydraulic cylinder.

14. The barrier transfer machine as set forth in claim 10, wherein the state of the variable length barrier is a position of the variable length barrier before it is picked up by the entry snout.

15. The barrier transfer machine as set forth in claim 14, wherein the sensor includes a camera for sensing the position of the variable length barrier before it is picked up by the entry snout.

16. The barrier transfer machine as set forth in claim 14, wherein the sensor includes a GNSS or GPS receiver for sensing the position of the variable length barrier before the variable length barrier is picked up by the entry snout.

17. The barrier transfer machine as set forth in claim 10, wherein the road surface is a roadway, a shoulder of a roadway; a driving lane on a bridge surface; a shoulder of a bridge surface;

a parking lot; an on-ramp; or an off-ramp.

18. A barrier transfer machine for picking up and repositioning a span of interconnected road barriers, wherein the span of interconnected road barriers includes at least one variable length barrier, the barrier transfer machine comprising:

an elongated moveable chassis having a front end and a rear end;

an entry snout mounted on the front end of the chassis for picking up the span of interconnected road barriers from a first location on a road surface;

an exit snout mounted on the rear end of the chassis for placing the span of interconnected road barriers back onto the road surface in a second location different from the first location;

a conveyor system positioned between the entry snout and the exit snout for transporting the span of interconnected road barriers from the entry snout to the exit snout;

a capstan system for adjusting tension or compression in the span of interconnected road barriers while the span of interconnected road barriers is being transported by the conveyor system;

a control system for operating the capstan system, the control system comprising:
- a data receiver for receiving data from a sensor that senses tension or compression in the span of interconnected road barriers by sensing a length of the variable length barrier, sensing tension or compression of a hydraulic cylinder inside the variable length barrier, or sensing a position of the variable length barrier before it is picked up by the snout; and
- a processing system for receiving and analyzing the sensor data to determine if the tension or compression of the span of interconnected road barriers is outside an acceptable range and for controlling operation of the capstan system to adjust the tension or compression in the span of interconnected road barriers if the tension or compression is outside the acceptable range.

19. The barrier transfer machine as set forth in claim 18, wherein the data receiver is further configured to receive data from a camera for sensing a position of the variable length barrier before it is picked up by the entry snout.

20. The barrier transfer machine as set forth in claim 18, wherein the data receiver is further configured to receive data from a GNSS or GPS receiver for sensing the position of the variable length barrier before the variable length barrier is picked up by the entry snout.

\* \* \* \* \*